F. V. DETWILER.
COOKING APPARATUS.
APPLICATION FILED FEB. 2, 1911.
1,064,298.
Patented June 10, 1913.
2 SHEETS—SHEET 1.
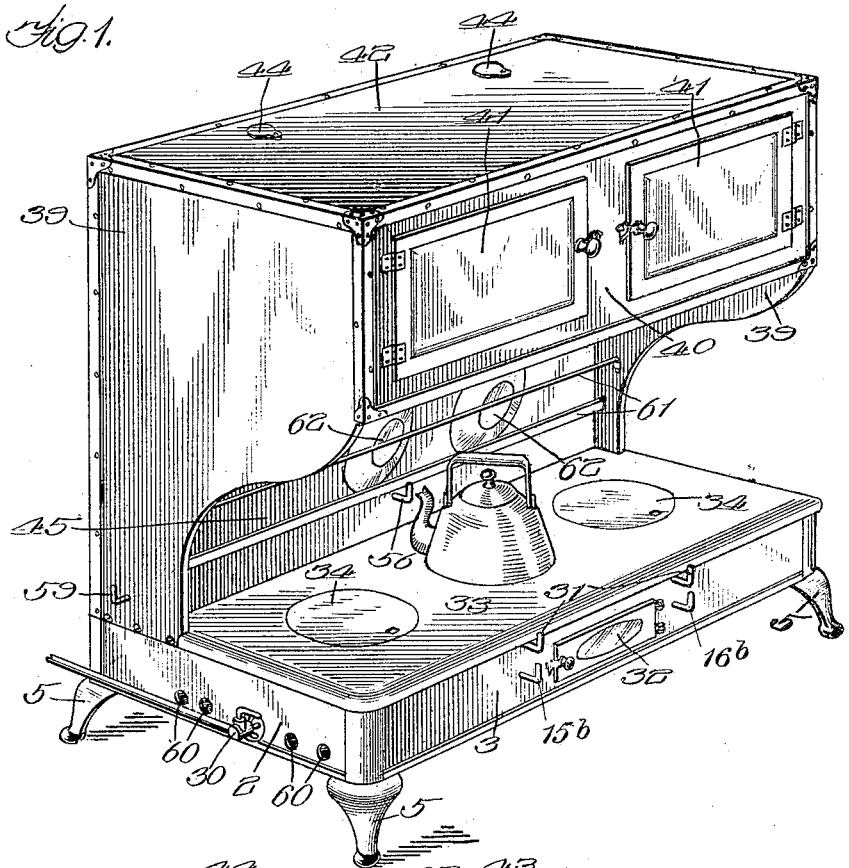
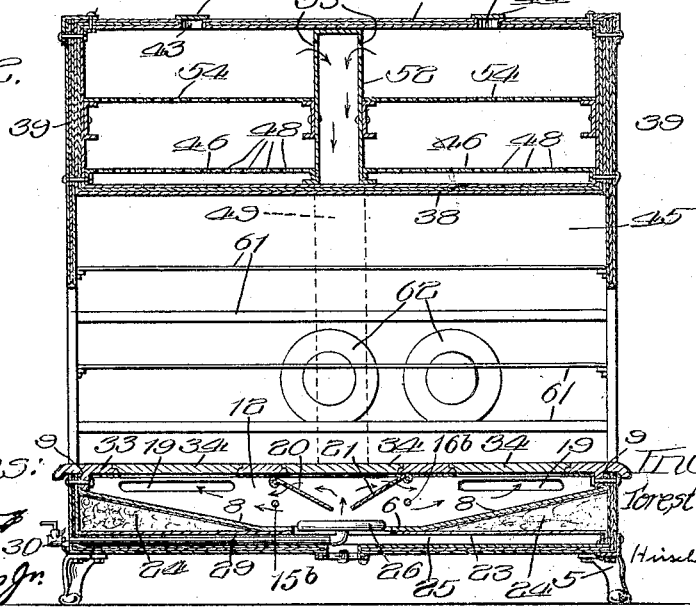

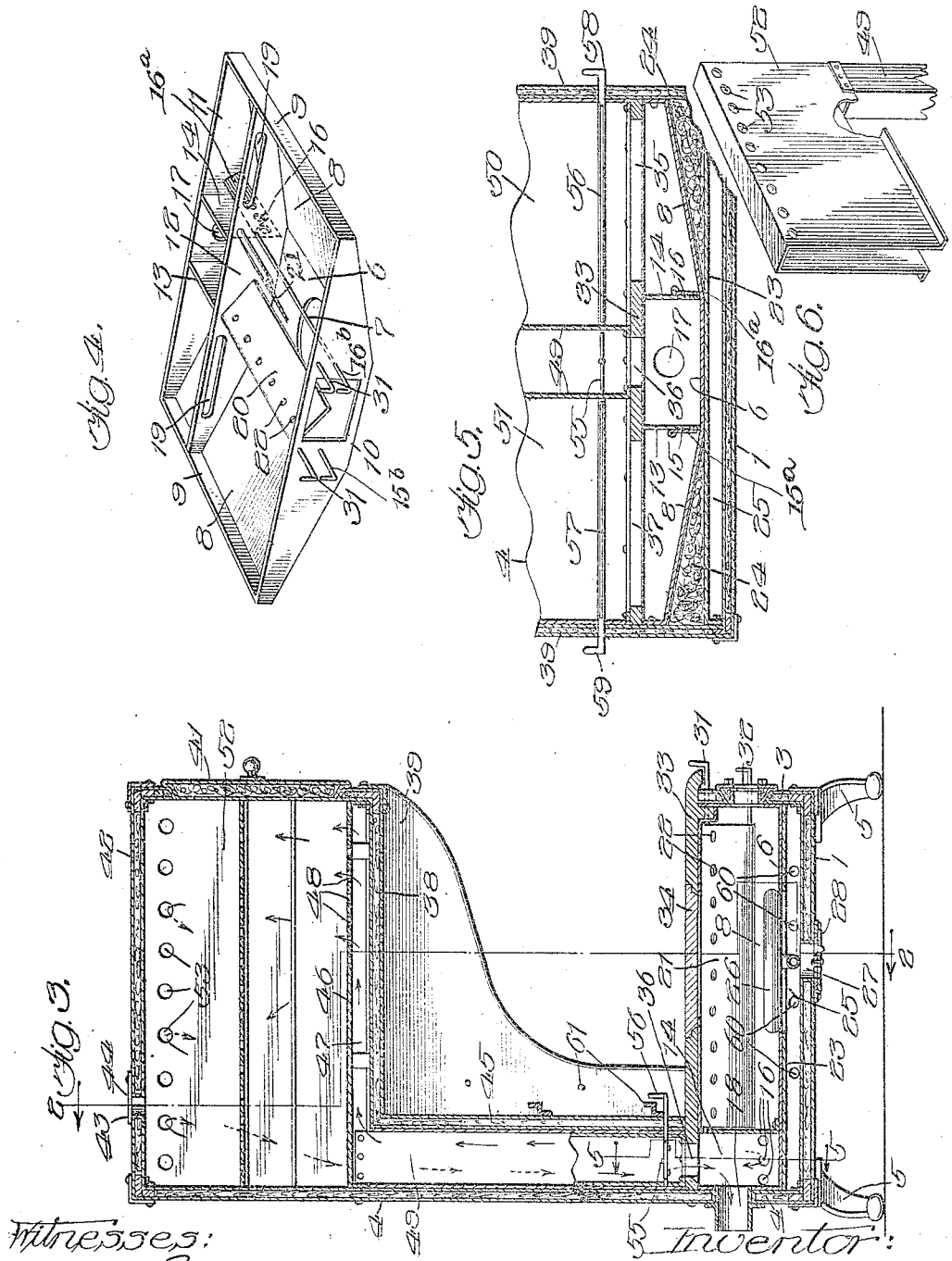

UNITED STATES PATENT OFFICE.

FOREST V. DETWILER, OF CHICAGO, ILLINOIS.

COOKING APPARATUS.

1,064,298.

Specification of Letters Patent. Patented June 10, 1913.

Application filed February 2, 1911. Serial No. 606,109.

*To all whom it may concern:*

Be it known that I, FOREST V. DETWILER, a citizen of the United States, residing at Chicago, county of Cook, and State of Illinois, have invented certain new and useful Improvements in Cooking Apparatus, of which the following is a full, clear, and exact specification.

This invention relates to cooking apparatus and is especially designed for the use of fluid fuel, and one of the objects of the invention is to construct an improved device of this character for conserving the heat, and in which the heat from a single burner may be so controlled that several different cooking operations may be performed in different parts of the apparatus at the same time.

Another object is the provision of an improved portable device of this character which is of a very simple and cheap construction, thereby cheapening the cost of manufacture, and one in which the cost of maintenance is extremely low.

Other and further objects will appear from the annexed specification and claims when taken in connection with the accompanying drawings, wherein—

Figure 1 is a perspective view showing a cooking apparatus embodying the invention. Fig. 2 is a sectional view taken on line 2—2, Fig. 3. Fig. 3 is a longitudinal vertical sectional view. Fig. 4 is a perspective view of a tray or frame in the base of the apparatus showing a portion of the heat passages and the dampers for controlling the heat. Fig. 5 is a detail sectional view on line 5—5, Fig. 3. Fig. 6 is a detail perspective view of the partition between the ovens and the heat exit flue, with a portion broken away.

The base of the apparatus is hollow and comprises a bottom 1, sides 2, and front and back walls 3 and 4. The back wall 4 extends for some distance above the remaining walls for a purpose that will later appear. These walls are preferably insulated, as shown, to prevent radiation and dissipation of heat into the rooms, and also so as to confine the products of combustion and heated air within the apparatus. The base of the apparatus may be of any shape and size, and the whole is supported upon legs 5. Within the base thus formed is a shallow metal tray or frame, shown in Fig. 4, having a bottom including a flat horizontal portion 6 through which is cut a circular opening 7. Projecting from opposite sides of the portion 6 are upwardly inclined portions 8, the lateral edges of which terminate in substantially upright flanges 9. A front wall 10 extends across the front edges of the portions 6 and 8 and also across the front ends of the flanges 9, and a similar wall 11 extends across the rear edges of the portions 6 and 8 and the flanges 9. The upper edges of the front and rear walls 10 and 11 terminate flush with the upper edges of the flanges 9. A partition 12 is arranged in the tray or frame thus formed and is spaced from the walls 10 and 11 but is arranged adjacent the wall 11, and the upper edge of this partition terminates flush with the upper edges of the walls 10 and 11.

Two partitions 13—14 divide the space formed between the wall 11 and partition 12 into three compartments, the intermediate compartment constituting what might be termed an outlet chamber, and these partitions 13—14 are respectively provided with a series of apertures 15—16 whereby communication will be directly formed between the outlet chamber and the chambers on each side thereof, and dampers 15$^a$ and 16$^a$ having operating handles 15$^b$ 16$^b$ are provided for the respective apertures 15—16. The rear wall of the outlet chamber is provided with a flue opening 17 into which the end of a flue 18 is projected through an opening in the rear wall 4 of the base. The partition 12 is provided with openings 19 preferably adjacent the top thereof to form passages for the heated air or gases. Two dampers 20, 21, are arranged longitudinally in this tray, each being pivoted at one end to the partition 12 and at its other end to the front wall 10. These dampers are provided with apertures 22 therethrough to permit some of the heated air to pass through the dampers, and the dampers are of such a size that when turned in an upright position their lower edges will stand close to the horizontal portion 6 of the tray bottom for a purpose to appear. This frame or tray is placed in the base of the apparatus and is removably held in any suitable manner as by bolts, and the spaces formed between the upwardly inclined portions 8 of the bottom and a supplemental bottom 23 in the base are filled with insulation 24. This supplemental bottom 23 is spaced from the bottom 1 to form an air passage or space 25 which is provided to furnish air to the burner 26, which latter is arranged adjacent the opening 7 in the tray bottom. This space 25 has communication with the outside air through an opening 27 in the bottom 1, and which opening is controlled by a damper 28. The burner is arranged adjacent the space between the dampers 20—21 and receives its supply through the pipe 29 and is controlled by a valve 30. The handles 31 of the dampers project through the front 3 and the latter is provided with an opening having a closure 32 through which access may be had to the burner 26.

A top 33 is provided for the base and rests upon the upper edges of the walls 2 and 3, and the rear edge of the top abuts the portion of the back 4 which extends above the tops of the remaining walls. The top 33 is fastened in position in any desired manner and is provided with stove holes or openings, preferably three, each having a lid 34. One of these stove holes is provided through the top between the dampers 20—21 and one is provided on each side of the pair of dampers as shown. Thus if the dampers are adjusted to the positions shown in Fig. 2, they will act as baffle plates or deflectors to equally distribute the heated air to all of the stove holes.

If the dampers are adjusted uprightly and parallel the products of combustion will be directed upward to the central stove hole whence they may either escape through the same, or, if such hole is closed by one of the stove lids, or by a cooking vessel as is intended, they will be deflected downward and sidewise and will escape through the openings 22 in the dampers 20 and 21. In such case if a cooking vessel is placed over the central stove hole opening the products of combustion will impart a large part of their heat to the bottom of such vessel before escaping through the holes 22, and after losing such part of their heat they will contract in volume sufficiently to permit their escape through the holes 22; the purpose of the dampers 20 and 21 when so arranged being to prevent a direct escape of the products of combustion through the openings 19 without imparting a substantial amount of their heat to a cooking vessel placed over the central stove hole. If, however, the dampers are adjusted so that they will rest flat against the lower face of the top 33 and with their free edges substantially in contact, they will prevent the heated air from being discharged to the central stove hole but will deflect such heated air to the other holes. Thus it will be seen that the dampers may be manipulated at will to control the direction of flow of the heated air so that the amount conducted to any one or more of the stove holes may be varied.

The portion of the top 33 over the chambers in the rear of the partition 12 is provided with openings 35—36—37 forming passages for the heated air having communication with the respective chambers. The back 4 as before stated, extends for any desired distance above the top 33 and forms the back wall of an oven which is of a length equal to the length of the base, and may be of any desired size. The bottom 38 thereof is preferably of a width substantially equal to the width of the top 33. The sides 39 of the oven are formed by uprights rising from the base of the apparatus and these uprights are preferably reduced in width adjacent the base as shown. The front wall 40 of the oven is provided preferably with two door openings, having closures 41; and other openings 43 are provided, preferably in the top 42, for the purpose of ventilating the oven and causing a circulation of the heated air therein. The latter openings are likewise provided with closures, 44.

A supplemental wall 45 is arranged in advance of and spaced from the back wall below the oven and with one end resting against the top 33 of the base and in advance of the openings 35—36—37. The upper end of this wall 45 is connected with the bottom 38 of the oven, and which bottom terminates short of the wall 4, thereby forming a passage having a communication with the oven and the openings 35, 36, 37 so that heated air from the burner 26 in the base may flow through the openings 19 in the partition 12 and into the passage between the walls 4 and 45 from where it flows into the oven.

The oven is provided with a supplemental bottom 46 spaced above the bottom 38 to form a passage 47 for the heated air having communication with the passage between the walls 4 and 45 and apertures 48 are provided in the bottom 46 which lead into the oven. Arranged between the walls 4 and 45, so as to engage the walls, is a centrally disposed tubular member 49, one end of which rests upon the top of the base and over the opening 36 therein. This tubular member forms a small flue and also divides the space between the walls 4 and 45 into passages 50—51, one on each side of the flue 49, and these passages have communication respectively with the openings 35—37. A hollow partition 52 is arranged in the oven preferably centrally thereof and to extend from the front to the rear wall, to divide the oven into two chambers, one on each side of the partition, and the door openings in the front wall 40 are arranged so that one will afford access to each of the chambers. The space in the partition 52 is of a width substantially equal to the width of the flue 49 and with which space the upper end of the flue 49 has communication adjacent the back of the oven. The partition extends from the top 42 to the bottom 38 and the side walls of the partition are provided with openings 53 adjacent the top 42 of the oven. By extending the partition 52 to the bottom 38 the space in the partition will be closed to direct communication with the heat passage 47 and will divide said passage into two passages one beneath each chamber of the oven. The flue 49 communicates with the space in the hollow partition 52 and also with the rear central compartment of the base tray shown in Fig. 4; which compartment in turn communicates through the opening 17 with the outlet flue 18. Shelves 54 may be provided in the two chambers of the oven, and may be supported in any suitable manner. These shelves are perforated to permit the circulation of heated air through the two chambers, as will be understood.

In order to control the passage of the heated air through the flue 49 a damper 55 is provided in the flue preferably above the opening 36, and the handle 56 thereof projects through the wall 45, whereby the damper may be easily manipulated. Similar dampers 56—57 are provided in the passages 50—51 and the handles 58—59 thereof project through the sides 39 so that the dampers may be easily actuated.

In operation, the dampers 20—21 are first adjusted so as to direct the products of combustion from the burner in a direction to flow to any one or more of the stove openings, and if the oven is not to be used the dampers 56—57 are adjusted to close the passages 50—51 as well as the damper 55 to close the flue 49. The heated air thus confined in the base will pass through the openings 19 in the partition 12 and thence through the openings 15—16 in the partitions 13—14 and thence out the opening 17 and outlet flue 18. The surrounding or inclosing walls of the apparatus are preferably insulated or constructed from heat insulating material for conserving the heat. When it is desired to use both chambers of the oven the dampers 15ª 16ª are first closed and the dampers 56—57 are adjusted to open the passages 50—51, and the damper 55 is also adjusted to open the flue 49. The heated air from the burner 26 will then flow from the base through the openings 19 in the partition 12 and then into the passages 50—51 through the respective openings 35—37. From the passages 50—51 it will flow into the passage 47 at the bottom of the oven and on the respective sides of the partition 52, into the two chambers through the openings 48 in the supplemental bottom 46, which openings are located preferably some distance from the passages 50—51 so as to cause the heated air to flow under the entire bottom of the oven. From the two chambers the heated air passes out of the top thereof and into the hollow partition 52 through the openings 53 in the walls thereof. From the hollow partition it will flow down the flue 49 out through the opening 17 and flue 18. By manipulating the dampers 56—57 one or the other of the two chambers may be cut off from its supply of heated air, and by further manipulating these dampers any desired amount of heated air may be supplied to the oven, as will be understood. The dampers or closures 44 of the openings 43 in the top 42 may be adjusted to control the temperature in the oven chambers. Openings 60 may be provided in the walls 2 of the base, which communicate with the space 25 for supplying outside air to the burner 26. Racks 61 may be provided adjacent the wall 45 for receiving dishes 62 to be warmed.

While there is shown and described the preferred manner in which this apparatus may be constructed, it is to be understood that various changes may be made within the scope of the claims without departing from the spirit of this invention.

The term "heated air" employed in the specification and claims of this application is intended to cover products of combustion or any heating medium adapted for circulation, and which is derived from a heater or a burner, as will be understood, the object being not to limit the invention solely to the products of combustion from a burner.

What is claimed as new is:—

1. A cooking apparatus embodying a hollow base provided with a plurality of stove holes therein, a burner within the base beneath one of the holes, a pair of dampers one disposed on each side of the burner, and means for adjusting the dampers to direct the heated gases from the burner to circulate across one or more of the stove holes, said dampers being adapted to be projected across one of the stove holes and between said hole and said burner to shut off the heated gases from said hole.

2. A cooking apparatus embodying a hollow base having a plurality of stove holes, a burner therein, dampers within the base for directing the heated gases to one or more of the stove holes, a discharge outlet for the heated gases leading from the base, and means for causing the heated gases to circulate across one or more of the stove holes to the said discharge outlet, said dampers being provided with passages whereby a portion of the heated gases may pass therethrough, and said dampers being adapted to be projected across one of the stove holes for intercepting the heated gases.

3. A cooking apparatus embodying a base having stove holes therein, a heater for the stove holes, an oven spaced from the base, a hollow partition dividing the oven into separate chambers and provided with passages forming communication between the space in the partition and the respective chambers, a discharge outlet for the heater, a passage between said outlet and the space in said partition, passages for receiving the heated gases from the heater and conducting them to the respective chambers, and dampers in said passages.

4. A cooking apparatus having a top provided with a central and side openings, deflectors under the side openings inclining toward each other and away from the top and in a direction toward the central opening, and dampers for closing the respective spaces between the top and the deflectors, said dampers being disposed on opposite sides of the central opening and adapted to be projected across the said central opening.

5. A cooking apparatus having a top provided with a plurality of stove holes therein, means beneath one of the holes whereby heat may be supplied, a pair of dampers one disposed on each side of the said means, and means whereby said dampers may be adjusted to direct the heated air to circulate across one or more of the stove holes, said dampers being adapted to be projected across one of the stove holes and between the said hole and the first recited means to shut off the heated air from said hole.

6. A cooking apparatus embodying an oven, a hollow partition in the oven dividing the same into separate chambers, there being passages through the walls of the said partition having communication with the respective chambers, a discharge outlet, means whereby the space in the partition has communication with said discharge outlet, and means for conducting heated air to the oven chambers.

7. A cooking apparatus embodying an oven, a hollow partition in the oven dividing the same into separate chambers, there being passages through the walls of the said partition having communication with the respective chambers, a discharge outlet, means whereby the space in the partition has communication with said discharge outlet, means for conducting heated air to the oven, and means for controlling the said means at will.

8. A cooking apparatus embodying an oven, a hollow partition in the oven dividing the same into separate chambers, there being passages through the walls of the said partition having communication with the respective chambers, a discharge outlet, means whereby the space in the partition has communication with said discharge outlet, passages individual to the oven chambers leading to the chambers, and dampers individual to the last said passages.

9. A cooking apparatus embodying an oven, a hollow partition in the oven dividing the same into separate chambers, there being passages through the walls of the said partition having communication with the respective chambers, a discharge outlet, means whereby the space in the partition has communication with said discharge outlet, means for conducting heated air to the oven chambers, there being one or more passages leading through the walls of the chambers for controlling the temperature in the oven, and dampers for controlling the last said passages.

10. A cooking apparatus embodying an oven, a hollow partition in the oven dividing the same into separate chambers, there being passages through the walls of the said partition having communication with the respective chambers, a discharge outlet, means whereby the space in the partition has communication with said discharge outlet, means for conducting heated air to the oven chambers, there being one or more passages leading through the walls of the chambers for controlling the temperature in the oven, and dampers for controlling the last said passages, the last said passages having direct communication with the outside air.

11. A cooking apparatus embodying an oven, a hollow partition in the oven dividing the same into separate chambers, there being passages through the walls of the said partition having communication with the respective chambers, a discharge outlet, means whereby the space in the partition has communication with said discharge outlet, means for conducting heated air to the oven chambers, there being one or more passages leading through the walls of the chambers for controlling the temperature in the oven, and dampers for controlling the last said passages, the last said passages having direct communication with the outside air, and being located some distance from the passages in the partition and from the said means.

12. A cooking apparatus embodying a hollow base, having a heating chamber, an outlet chamber, and an intermediate chamber communicating with both of said chambers, a heater within the heating chamber, the last recited chamber having stove holes in the top thereof, dampers for directing the heat to one or more of the stove holes, an oven arranged above the base, a passage leading from the intermediate chamber to the oven, a discharge outlet for the oven, and means for controlling the direct flow of the heated air from the intermediate chamber to the outlet chamber.

In witness whereof, I have hereunto set my hand in the presence of two witnesses this thirty-first day of January, 1911.

FOREST V. DETWILER.

Witnesses:
T. GRAHAM DIPLOCK,
MARY McCARTY.